(12) United States Patent
Lafont et al.

(10) Patent No.: US 8,083,176 B2
(45) Date of Patent: Dec. 27, 2011

(54) METHOD FOR MOUNTING AN AIRCRAFT ENGINE ON A RIGID STRUCTURE OF A STRUT FOR LOCKING THE ENGINE

(75) Inventors: Laurent Lafont, Pechbusque (FR); Frederic Journade, Toulouse (FR); Eric Renaud, Brignemont (FR)

(73) Assignee: Airbus Operation SAS, Toulouse (FR)

( * ) Notice: Subject to any disclaimer, the term of this patent is extended or adjusted under 35 U.S.C. 154(b) by 917 days.

(21) Appl. No.: 12/067,190

(22) PCT Filed: Sep. 22, 2006

(86) PCT No.: PCT/EP2006/066633
§ 371 (c)(1),
(2), (4) Date: Mar. 18, 2008

(87) PCT Pub. No.: WO2007/033993
PCT Pub. Date: Mar. 29, 2007

(65) Prior Publication Data
US 2008/0223983 A1    Sep. 18, 2008

(30) Foreign Application Priority Data
Sep. 26, 2005   (FR) ...................................... 05 52868

(51) Int. Cl.
*B64D 27/00*    (2006.01)
(52) U.S. Cl. ........................................................ 244/54
(58) Field of Classification Search .................... 244/54; 248/554–557; 60/39.31, 796
See application file for complete search history.

(56) References Cited

U.S. PATENT DOCUMENTS

| | | | | |
|---|---|---|---|---|
| 4,943,013 A | * | 7/1990 | Kapala et al. .................... | 244/54 |
| 5,351,930 A | * | 10/1994 | Gwinn et al. .................. | 248/557 |
| 5,474,258 A | * | 12/1995 | Taylor et al. .................... | 244/54 |
| 5,649,417 A | * | 7/1997 | Hey .................................. | 60/797 |
| 6,330,995 B1 | * | 12/2001 | Mangeiga et al. ............ | 248/554 |
| 6,517,027 B1 | * | 2/2003 | Abruzzese .................. | 244/129.4 |
| 6,682,015 B2 | * | 1/2004 | Levert et al. .................... | 244/54 |
| 6,938,855 B2 | * | 9/2005 | Marche ............................ | 244/54 |
| 6,986,482 B2 | * | 1/2006 | Brefort et al. ................... | 244/54 |
| 7,566,029 B2 | * | 7/2009 | Dron et al. ....................... | 244/54 |
| 7,654,093 B2 | * | 2/2010 | Lefebvre et al. ............... | 60/779 |
| 7,789,344 B2 | * | 9/2010 | Cousin et al. ................... | 244/54 |

FOREIGN PATENT DOCUMENTS
EP    1 281 615    2/2003

OTHER PUBLICATIONS

U.S. Appl. No. 12/918,500, filed Aug. 20, 2010, Journade, et al.
U.S. Appl. No. 12/918,334, filed Aug. 19, 2010, Journade, et al.
U.S. Appl. No. 12/918,530, filed Aug. 20, 2010, Journade, et al.

* cited by examiner

*Primary Examiner* — Tien Dinh
(74) *Attorney, Agent, or Firm* — Oblon, Spivak, McClelland, Maier & Neustadt, L.L.P.

(57) ABSTRACT

A method to mount an aircraft engine on a rigid structure of an engine mount, includes securing, on the structure, an attachment body for an engine attachment, the attachment body configured to lie against a contact surface of the rigid structure oriented forwardly, and secured to the structure by at least one shear pin passing through a first and a second primary orifice. The securing of the body includes: pre-positioning the engine relative to the engine mount to place the first orifice opposite the second orifice, and inserting a pin fitted with a convex centering head through the two orifices, so that the pin forms the shear pin.

12 Claims, 7 Drawing Sheets

METHOD FOR MOUNTING AN AIRCRAFT ENGINE ON A RIGID STRUCTURE OF A STRUT FOR LOCKING THE ENGINE

TECHNICAL AREA

The present invention generally relates to a method to mount an aircraft engine on a rigid structure of a pylori used to secure this engine, also known as <<EMS>> for Engine Mounting Structure, the method permitting the suspending of a turbojet engine below the wing of an aircraft for example, or the mounting of this turbojet engine above this same wing.

By way of indication, the invention finds application for any type of aircraft equipped with turbojet engines for example, or turboprop engines.

STATE OF THE PRIOR ART

Said engine mount is effectively designed to form a connecting interface between an engine such as a turbojet engine and an aircraft wing. It allows the loads generated by its associated turbojet engine to be transmitted to the airframe, and also provides a path for fuel lines, electric systems, hydraulic systems and air between the engine and the aircraft.

To ensure the transmission of loads, the engine mount comprises a rigid structure often of <<box>> type, i.e. formed by the assembly of upper and lower spars and of two side panels joined together via transverse ribs, this box being closed at its forward and aft ends by a forward closure rib and aft closure rib respectively.

Also, the engine mount is provided with an engine mounting system inserted between the turbojet engine and the rigid structure of the engine mount, this system globally comprising at least two engine attachments, generally a forward attachment and an aft attachment.

Additionally, the mounting system comprises a thrust mount device transferring thrust loads generated by the turbojet engine. In the prior art, this device is in the form of two side links for example, connected firstly to an aft portion of the fan case of the turbojet engine, and secondly to the aft engine attachment fixed to the engine case.

Similarly, the engine mount also comprises a second mounting system inserted between the rigid structure of this engine mount and the aircraft wing, this second system usually consisting of two or three attachments.

Finally, the engine mount is provided with a secondary structure to separate and support the different systems whilst carrying aerodynamic cowling.

In the prior art embodiments, the engine mounting system comprises a forward attachment, called the fan attachment since it is intended to be fixedly mounted on the fan case of the engine, which comprises an attachment body having a horizontal contact surface lying against a horizontal contact surface of the rigid structure, these contact surfaces also being called securing surfaces. The horizontal securing interface formed by these two surfaces therefore extends along a plane defined by the longitudinal and transverse directions of the engine mount, and is generally located at an outer surface of the lower spar of the box if the engine is to be suspended below the aircraft wing. The attachment body for the forward engine attachment is generally fixed to the lower spar of the box, being arranged below it.

Similarly, the aft attachment usually comprises an attachment body also having a horizontal contact surface lying against a horizontal contact surface of the rigid structure.

With said arrangement, the method for mounting the engine on the rigid structure is generally implemented by lifting the engine vertically upwards until the contact surfaces come to lie against each other, then securing members are mounted between the attachment bodies and the rigid structure.

It has been noted however that this method of procedure leads to certain mounting difficulties, notably in terms of accessibility with respect to handling the securing members intended to ensure the assembly of the attachment bodies which are provided with horizontal contact surfaces.

SUMMARY OF THE INVENTION

The purpose of the invention is therefore to propose a method to mount an aircraft engine on a rigid structure of an engine mount, which overcomes the above-mentioned drawback of prior art embodiments.

To do so, the subject-matter of the invention is therefore a method to mount an aircraft engine on a rigid structure of a mount for this engine, this method comprising a securing step, onto this rigid structure, of an attachment body for an engine attachment previously mounted on an engine case, this attachment body being intended to lie against a contact surface of the rigid structure oriented forwardly, and secured to this rigid structure via at least one shear pin passing through a first primary orifice and a second primary orifice made in the attachment body and the rigid structure respectively. The securing step of the attachment body onto the rigid structure comprises the following successive operations:

pre-positioning the engine relative to the engine mount for the purpose of placing the first primary orifice opposite the second primary orifice; and inserting a pin fitted with a convex centering head through the two opposite-facing primary orifices, so that this pin fitted with the convex centering head and housed in the two primary orifices forms the shear pin.

Therefore, the proposed invention has the particular aspect that it uses a rigid structure having a contact surface oriented forwardly, unlike embodiments encountered in the prior art in which the contact surfaces provided on the rigid structure and intended to receive attachment bodies for engine attachments are oriented horizontally and downwards.

As a result, owing to the special arrangement of this contact surface, which can for example be oriented substantially vertically i.e. in a plane defined by transverse and vertical directions of the engine mount, or even slightly at an angle relative to the vertical while preferably remaining parallel to the transverse direction, there is advantageously obtained an improvement in accessibility for maneuvering the securing members intended to ensure the assembly of an attachment body onto the rigid structure, whether to secure the forward engine attachment or the aft engine attachment. In both these cases, the attachment body is therefore a forward attachment body or an aft attachment body respectively.

By way of illustration, for the securing of the attachment body of the forward attachment, provision can advantageously be made to fix this body onto a forward surface of the forward closure rib of the box-shaped rigid structure. Since the entire rigid structure is positioned towards the aft relative to the securing interface, the operator therefore has the benefit of a free space forward of this interface which largely facilitates handling of the different parts used to achieve securing of the attachment body.

The pre-positioning operation of the engine is conducted so that the two primary orifices are pre-centerd i.e. they are roughly aligned before starting the operation to insert the pin, in these same primary orifices, that is subsequently intended to form the shear pin ensuring the transfer of engine loads towards the engine mount.

Next, this pin inserting operation is carried out to insert the pin in the primary orifices, this pin being provided with a convex centering head whose function, during insertion of the pin, is gradually to correct the rough alignment between the two primary orifices, if this proves necessary, in order to arrive at perfect alignment of these two orifices.

Evidently, it is noted that the pre-positioning of the engine relative to the rigid structure is performed with sufficient accuracy so that the pin with convex head is able successively to enter the first then the second primary orifice, or conversely, generating progressive correction of alignment and translating as a relative movement between the engine and the rigid structure, despite the substantial vertical load associated with the engine.

Finally, it is indicated that once the pin insertion operation is completed, this pin is then intended to remain permanently in the two primary orifices, to form the shear pin between the attachment body and the rigid structure. Therefore, one of the particular aspects of this invention lies in the fact that the convex centering head, which may preferably be olive-shaped, is initially used during mounting to ensure gradual alignment of the primary orifices until perfect alignment is achieved, and is then used to form part of the shear pin transferring loads towards the rigid structure when the engine is in operation.

Preferably, when several shear pins are provided between the attachment body and the rigid structure, the insertion operation of a pin equipped with a convex centering head is repeated as many times as the number of intended shear pins. In said case, it is preferably provided that the initial engine pre-positioning operation is conducted so as to place all the first primary orifices opposite their respectively associated second primary orifices.

Preferably, this pre-positioning operation consists of:
bringing the engine close to the engine mount so that it is possible to insert a first support pin through a first secondary orifice and a second secondary orifice made in the attachment body and the rigid structure respectively, and so that it is possible to insert a second support pin through a first secondary orifice and a second secondary orifice also made in the attachment body and rigid structure respectively, each of the two support pins having a smaller diameter than the diameter of the first and second associated secondary orifices; then
lowering the engine until a bearing is obtained between an upper part of each of the two first secondary orifices of the attachment body and its associated support pin.

Therefore, the positioning of these support pins, also called indexing supports, ensures the holding of the engine slightly below its final position with respect to the engine mount, this position being fully appropriate for subsequent insertion of the centering pin with convex head in the primary orifices.

Preferably, after each centering pin with convex centering head has been placed in position, these support pins are removed from the secondary orifices using a suitable extractor. It is noted that in the preferred, advantageous, case in which the above-mentioned secondary orifices are subsequently intended to receive failsafe shear pins, this removal of the support pins is followed by the insertion of two failsafe shear pins through these same secondary orifices.

Again preferably, the pre-positioning operation is conducted so that the attachment body is positioned forwardly relative to the contact surface of the rigid structure, and the operation to insert the pin with convex centering head is performed so that this pin is firstly inserted in its first associated primary orifice, before entering its second associated primary orifice. In said case, to facilitate the insertion of the convex centering head in the second primary orifice, each second primary orifice is bevelled in its forward portion.

Preferably, the step to secure the attachment body onto the rigid structure also comprises an operation to position tension bolts between these two elements.

Additionally, as mentioned previously, provision may be made so that the above-described step to secure the attachment body onto the rigid structure is conducted for the securing of an aft engine attachment or for the securing of a forward engine attachment. Evidently, the method of the invention could comprise two securing steps such as just described, one intended to secure the forward engine attachment, and other to secure the aft engine attachment.

When this securing step is performed for the securing of a forward engine attachment, provision is made so that the contact surface of the box-shaped rigid structure is defined by a forward surface of a forward closure rib of the box.

In this case, the contact surface is preferably designed so that it is substantially oriented along a plane defined by a transverse direction and a vertical direction of the engine mount, but could also alternatively lie at an angle relative to the vertical while remaining oriented forwardly as already indicated above, the angle then possibly reaching 25° relative to the vertical, i.e. relative to the above-mentioned plane. Also each pin with convex centering head is intended to be inserted into its associated primary orifices along a longitudinal direction of the engine mount. In general, it is preferably ensured that the shear pins formed by the above-mentioned pins are arranged orthogonal to the contact surface of the rigid structure, hence preferably orthogonal to the forward closure rib in the case concerning the forward attachment.

Other advantages and characteristics of the invention will become apparent in the non-limiting, detailed description given below.

BRIEF DESCRIPTION OF THE DRAWINGS

This description is made with reference to the appended drawings amongst which.

DETAILED DESCRIPTION OF PREFERRED EMBODIMENTS

Figure 1:
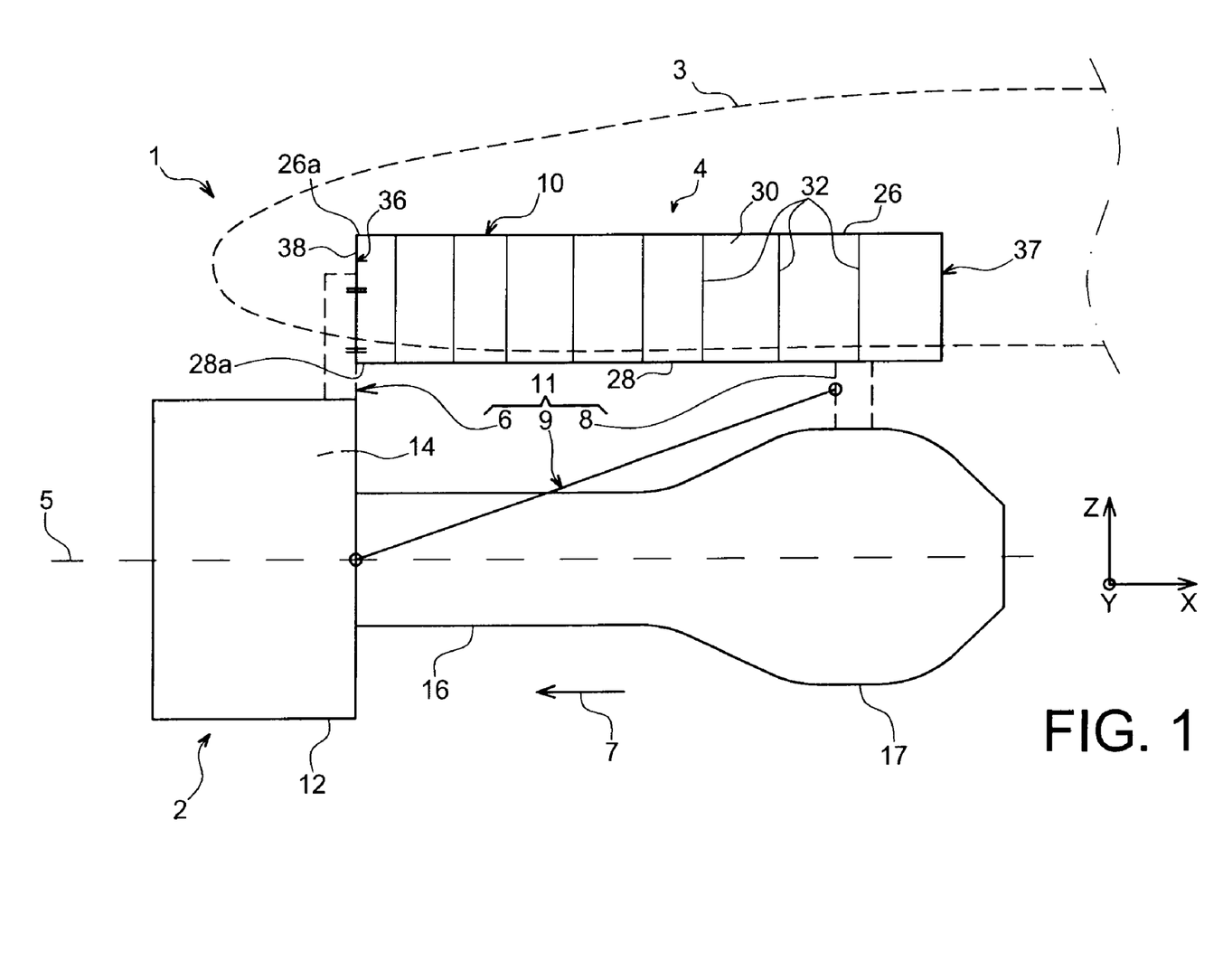
FIG. 1 is a partial schematic side view of an aircraft engine assembly comprising an engine mount, this assembly being shown in a configuration in which its engine has been mounted on a rigid structure of the engine mount when applying the mounting method according to one preferred embodiment of the present invention.

With reference to FIG. 1, an aircraft engine assembly 1 can be seen intended to be attached below a wing 3 of this aircraft, this assembly 1 being provided with an engine mount 4 and shown in a configuration in which its engine has been mounted on a rigid structure of the engine mount subsequent to implementation of a mounting method according to one preferred embodiment of the present invention which will be detailed below with reference to FIGS. 5*a* to 5*h*.

Globally, the engine assembly 1 comprises an engine such as a turbojet engine 2 and the engine mount 4, this mount being notably provided with a rigid structure 10 and an engine mounting system 11 consisting of a plurality of engine attachments 6,8, and of a thrust mount device 9 transferring loads generated by the turbojet engine 2, the mounting system 11 therefore being inserted between the engine and the above-mentioned rigid structure 10. By way of indication, it is noted that the assembly 1 is intended to be surrounded by a nacelle (not shown in this figure), and that the engine mount 4 comprises another series of attachments (not shown) used to suspend this assembly 1 below the aircraft wing.

In the remainder of the description, by convention, X designates the longitudinal direction of the engine mount 4 which is also comparable with the longitudinal direction of the turbojet engine 2, this direction X being parallel to a centerline 5 of this turbojet engine 2. Also, Y is used to designate the direction oriented transversally relative to the engine mount 4 and is also comparable with the transverse direction of the turbojet engine 2, and Z is the vertical direction or height, these three directions X,Y and Z lying orthogonal to each other.

Also, the terms <<forward>> and <<aft>> are to be considered with respect to a direction of travel of the aircraft subsequent to the thrust exerted by the turbojet engine 2, this direction being schematically represented by arrow 7.

In FIG. 1, it can be seen that only the thrust mount device 9, the engine attachments 6,8 and the rigid structure 10 of the engine mount 4, also called primary structure, have been illustrated. The other constituent elements of this engine mount 4 which are not shown, such as the means for suspending the rigid structure 10 below the aircraft wing, or the secondary structure to separate and support the different systems whilst carrying aerodynamic cowling, are conventional elements identical or similar to those found in the prior art and known to persons skilled in the art. Therefore no detailed description will be given thereof.

The turbojet engine 2 forwardly has a fan case 12 of large size delimiting an annular fan duct 14, and towards the aft comprises a central case 16 of smaller size enclosing the core of this turbojet engine. Finally, the central case 16 is extended towards the aft by an exhaust case 17 of larger size than case 16. Cases 12, 16 and 17 are evidently secured to one another.

As can be seen FIG. 1, the plurality of engine attachments consists of a forward engine attachment 6 and an aft engine attachment 8. The thrust mount device 9 is in the form of two side links for example (only one being visible since it is a side view) connected firstly to an aft portion of the fan case 12 and secondly to an evener bar, which itself is mounted on the aft attachment 8.

The forward engine attachment 6 is secured to the fan case 12, and is designed so that it can transfer the loads generated by the turbojet engine 2 along directions Y and Z. By way of indication, this forward attachment 6 preferably enters into an end portion of the circumference of the fan case 12.

The aft engine attachment 8 is globally inserted between the exhaust case 17 and the rigid structure 10 of the engine mount. It is of conventional design so that it is able to transmit the loads generated by the turbojet engine 2 in directions Y and Z, but not those loads exerted in direction X.

Figure 2:
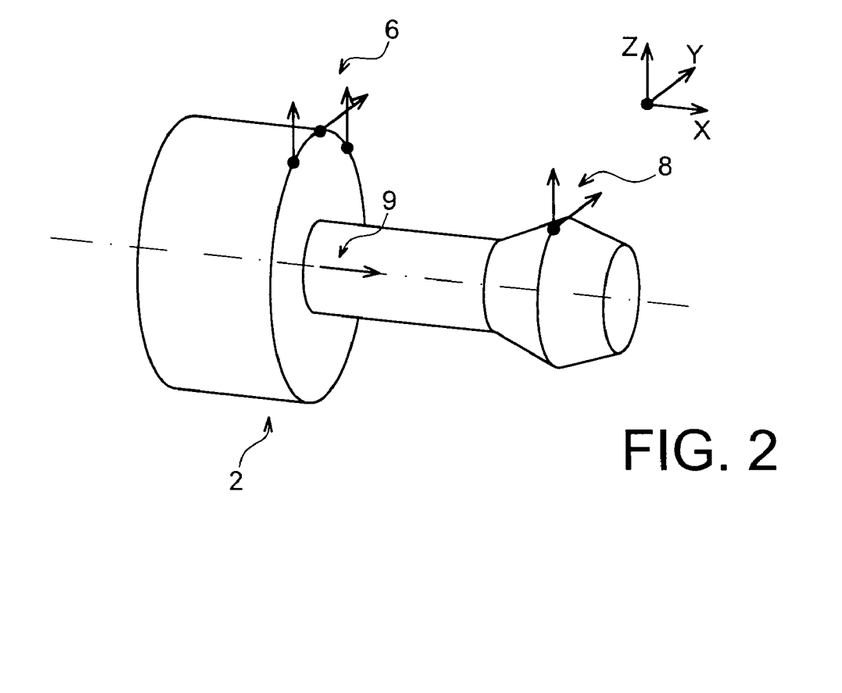
FIG. 2 is a perspective view schematising load transfer ensured by the engine mounting system fitted to the engine mount shown FIG. 1.

In this manner, with the mounting system 11 of isostatic type, as schematically illustrated FIG. 2, the transferring of loads exerted in direction X is obtained via device 9, the transfer of loads exerted in direction Y is achieved via the forward attachment 6 and aft attachment 8, and the transfer of loads exerted in direction Z is also achieved jointly via attachments 6 and 8. Additionally, the transfer of the moment exerted in direction X is made vertically via the forward attachment 6, the transfer of the moment exerted in direction Y is made vertically via the forward attachment 6 in conjunction with attachment 8, and the transfer of the moment exerted in direction Z is made transversally also via attachment 6 and attachment 8.

Still with reference to FIG. 1, it can be seen that the structure 10 is in the form of a box extending in direction X, this box also being called a torque box. It is conventionally formed of an upper spar 26 and a lower spar 28, and of two side panels 30 (only one being visible in FIG. 1) both extending in direction X and substantially along a plane XZ. Inside this box, transverse ribs 32 arranged along planes YZ and spaced apart longitudinally reinforce the rigidity of the box. It is noted by way of indication that elements 26, 28 and 30 can each be made in a single piece, or by the assembly of joining sections which may optionally lie slightly at an angle to each other. In addition, among the above-cited transverse ribs, there is a forward closure rib 36 closing the box and an aft closure rib 37 closing the box, these ribs positioned at the ends of the box therefore being globally arranged along planes YZ.

Again with reference to FIG. 1 illustrating a case in which the engine 2 is intended to be suspended below the wing 3, provision is made for the forward closure rib 36 of structure 10 to act as front bearing for an attachment body of the forward engine attachment 6. More precisely, the rib 36 has a forward surface 38 or outer surface globally arranged along plane YZ but possibly being of complex geometry, in particular for the purpose of defining protuberances against which this same attachment body is intended to lie.

Preferably, it is provided that a portion of this forward surface 38 defines a forward contact surface (not referenced) or forward securing surface intended to lie against and in contact with an aft contact surface (not shown) or an aft securing surface belonging to the attachment body of the forward attachment 6, as will be seen below in the description of the mounting method.

Therefore, with this special arrangement of the attachment body, it is possible to obtain partial overlap between the forward closure rib 36 and this same attachment body of the forward attachment 6, in direction Z, which globally allows compacting of the structure 10 with the forward engine attachment assembly, and hence reducing of the projection formed by the engine mount above the engine nacelle, over this attachment 6, thereby reducing aerodynamic drag.

Figure 3:
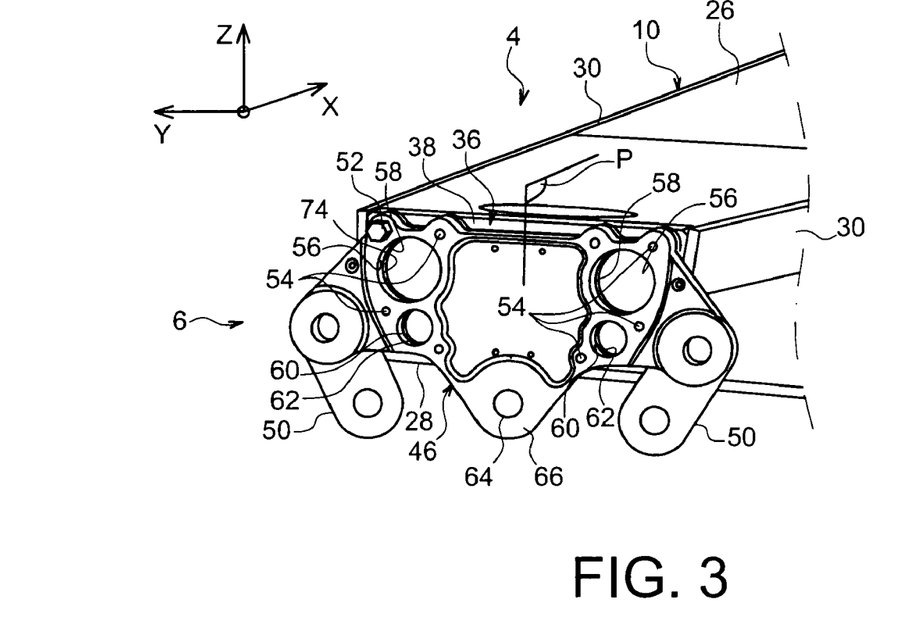
FIG. 3 is a detailed, perspective view of the forward portion of the engine mount illustrated FIG. 1.

With reference now to FIG. 3 giving a more detailed view of the forward part of the engine mount 4, in which a vertical median plane P parallel to direction X forms a plane of symmetry for this same engine mount, it can be seen that the forward engine attachment 6 therefore comprises an attachment body 46 in the form of a bracket oriented transversally along a plane YZ, being secured to the rigid structure 10 and lying against the forward surface 38 of the closure rib 36.

To ensure this assembly, the attachment 6 may comprise tension bolts 52 (only one being shown), these tension bolts being oriented along direction X and passing through orifices 54 made through the body 46 and the rib 36.

Also, attachment 6 additionally comprises two shear pins (not shown FIG. 3) also called active shear pins and arranged symmetrically relative to plane P, these pins also preferably being oriented along direction X. Each shear pin is intended to pass through a first primary orifice 56 made in the body 46, and a second primary orifice 58 made in the rib 36, being aligned with orifice 56 in direction X.

At two side ends of the attachment body 46, the forward engine attachment 6 has two devises on which two shackles/links 50 are pivoted, each thereof partly forming a semi-attachment of the forward attachment through which loads can transit exerted along direction Z. As is known to those skilled in the art, these shackles 50 are also pivoted at their other end on devises also belonging to the forward attachment 6, and being secured fixedly onto the engine case 2.

With the above-described design, it can be understood that this forward attachment is fully adapted to ensure the transmission of loads exerted along directions Y and Z, and also to ensure transfer of the moment exerted along direction X.

In this respect, it is preferably provided that each of the above-mentioned two groups of primary orifices 56, 58 is associated with a group of secondary orifices 60, 62 respectively provided in the body 46 and rib 36, each group of secondary orifices being designed to house a failsafe shear pin (not shown). The mounting of each failsafe shear pin in the first secondary orifice 60 and the second secondary orifice 62 leaves a radial clearance so that no load transits therethrough under normal conditions, and so that this pin is able to provide a new load path in the event of rupture of the main shear pin with which it is associated.

It is noted that one alternative embodiment may, in known manner, consist of providing that the two shear pins are designed to integrate the failsafe function, which would limit the use of pins and secondary orifices 60, 62 to the pre-positioning operations.

Again by way of indication, it is noted that this failsafe function is also ensured by the junction between the attachment body 46 and the engine case, via a failsafe pin 64 mounted with clearance at a lower central part 66 of the body 46.

Figure 4:
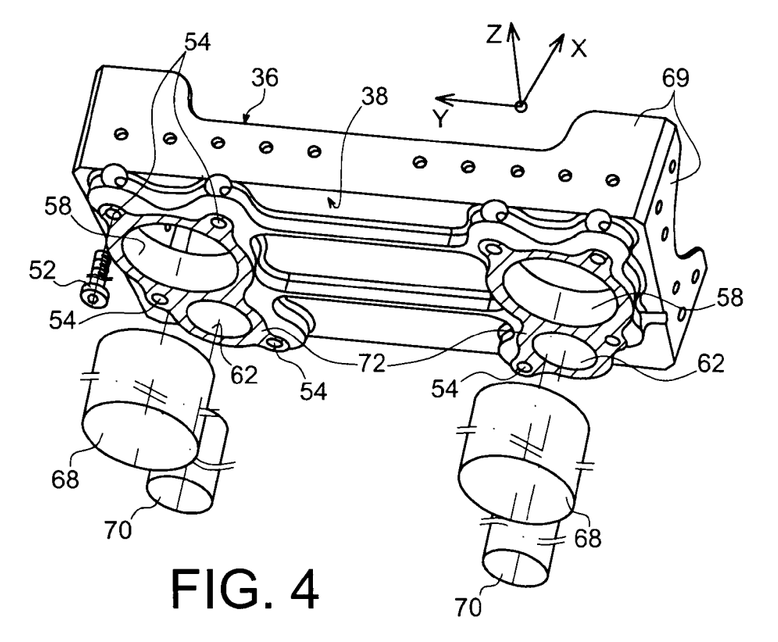
FIG. 4 is a perspective view of the forward closure rib of the box belonging to the engine mount illustrated FIG. 3.

With reference now to FIG. 4 showing the forward closure rib 36 of the box, it can be seen that the forward surface 38 of this rib has a surface globally oriented along a plane YZ, but preferably has protuberances projecting forwardly. Also the rib 36 has four fins 69 intended to be used for its securing to the spars 26, 28 and to the two side panels 30.

The above-mentioned protuberances are preferably located at portions of the rib 36 which delimit orifices 54, 58, 62 to house the bolts 52, shear pins 68 and failsafe pins 70. Also, it is at the most forward portion of these protuberances that the forward surface 38 delimits the forward contact surface 72 intended to lie against and in contact with the aft contact surface of the attachment body 46. This contact surface 72 or securing surface, cross-hatched in FIG. 4, is preferably substantially oriented along plane YZ, and hence is globally located at the contours of the above-mentioned orifices 54, 58, 62.

Evidently, it is to be appreciated that the aft contact surface or securing surface of the body 46, referenced <<74>> in FIG. 3, preferably has a shape which mates with the shape of surface 72, and is therefore preferably substantially oriented along the same plane YZ as the latter.

With reference now to FIGS. 5a to 5h, a method is described to mount an engine 2 on the engine mount 4 according to one preferred embodiment of the present invention, and more specifically a securing step to secure the attachment body 46 of the forward attachment 6 onto the forward closure rib 36 of box 10.

Figure 5A:
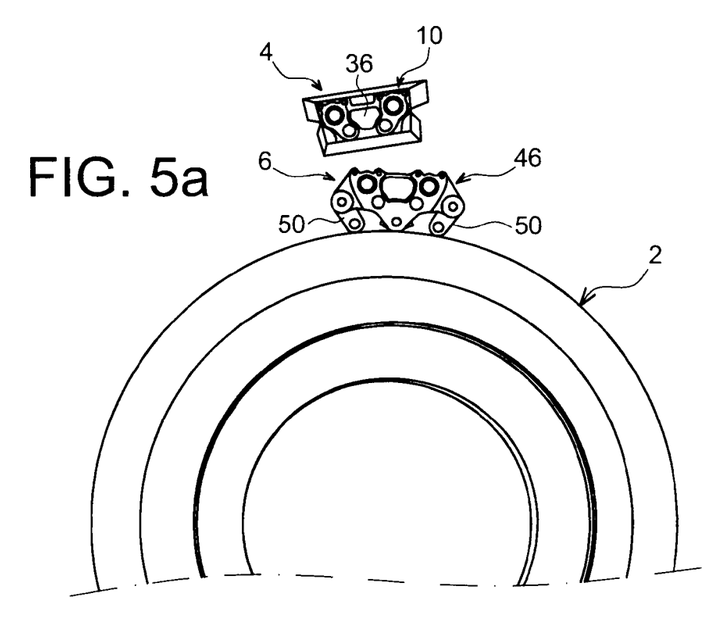
FIGS. 5a to 5h are views schematising different operations of a securing step in said mounting method, this step consisting of securing an attachment body for an engine attachment onto the rigid structure of the engine mount.

FIG. 5a shows that, prior to conducting this securing step, the engine 2 carries the attachment body 46, in particular via shackles/links 50 pivoted on the fan case. In addition, the engines rests in a so-called vertical or upright position in which the attachment body 46 lies upwardly, whilst the engine mount 4 lies in any position above the engine 2.

Before proceeding with moving the engine 2 using conventional lifting means, the body 46 is fitted with tooling enabling it to be blocked in position relative to the engine, and hence preventing pivoting of this body 46 about its two associated shackles/links 50. In this manner, the subsequent pre-positioning operation is advantageously unhindered by any relative movement between the body 46 and the engine 2.

The pre-positioning operation of the engine 2 relative to the engine mount 4 can then be initiated, its purpose being to place each of the two first primary orifices 56 opposite their associated second primary orifice 58. This pre-positioning of the engine 2 is performed so as to obtain rough alignment between the primary orifices, preferably by lifting the engine 2 to a position slightly above its final position relative to the engine mount 4. Therefore, as can be seen FIG. 5b, the first primary orifices 56 are slightly offset upwardly relative to the second primary orifices 58 made in the rib 36, and similarly the first secondary orifices 60 are slightly offset upwardly with respect to the second secondary orifices 62 made in this same rib.

Figure 5B:
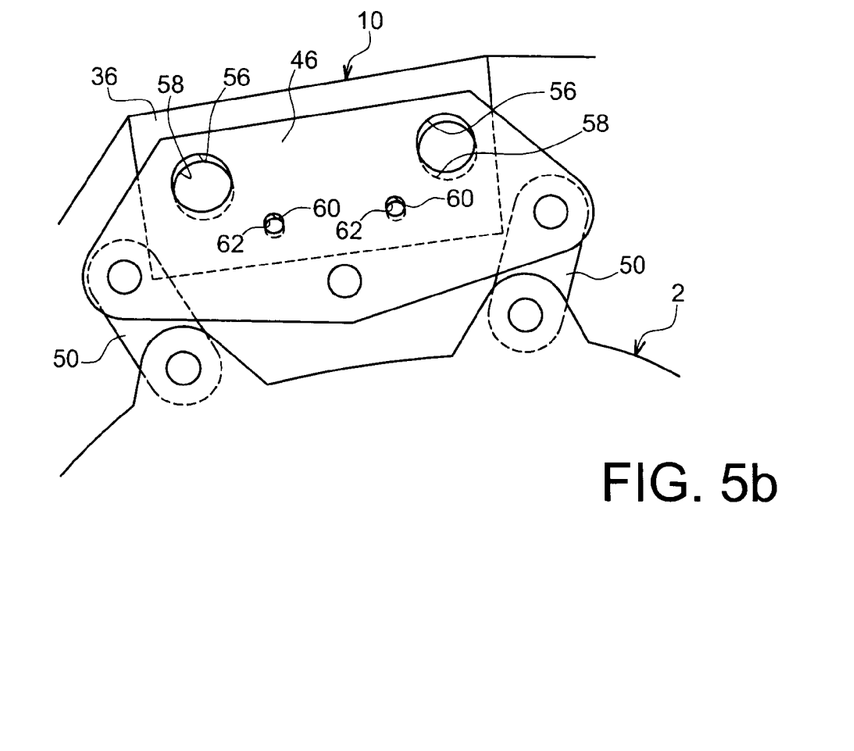
Figure 5C:
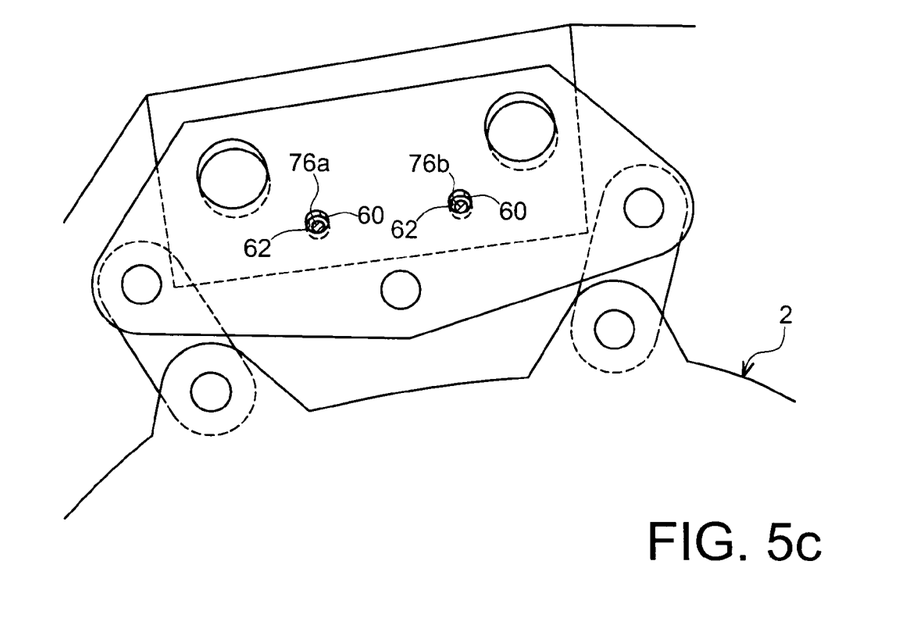

Next, the pre-positioning operation of the engine 2 is continued by inserting a first support pin 76a through the first group of secondary orifices 60, 62, and by inserting a second support pin 76b through the second group of secondary orifices 60, 62.

Evidently, the two support pins 76a, 76b, also called indexing pins, have a smaller diameter than the diameter of the secondary orifices 60, 62, the ratio between these diameters ensuring operating clearances and possibly ranging from 0.6 to 0.9. This specificity is evidently provided so that the insertion of pins 76a, 76b is able to be conducted unhindered, despite the presence of the vertical offset between the various orifices of substantially identical diameter. Once these pins 76a, 76b have been inserted, preferably manually and without any friction, in the secondary orifices, they then lie under gravity on a lower part of their associated first secondary orifice 60, without contacting their associated second secondary orifice 62 as shown FIG. 5c.

The operation then consists of lowering the engine 2, still using the lifting means, until an upper part of each of the two first secondary orifices 60 comes to bear against its associated support pin 76a, 76b. In this position shown FIG. 5d, it is also noted that the two support pins 76a, 76b rest on a lower part of their associated second secondary orifice 62. It is this shearing of pins 76a, 76b which alone allows the pre-positioning of the engine to be maintained relative to the engine mount, this pre-positioning then being such that the engine 2 lies slightly below its final position relative to the engine mount 4, as can be clearly seen FIG. 5d. Next, the pre-positioning is completed by contacting the contact surfaces 72 and 74 (referenced FIG. 5e) using adapted tooling e.g. of clamp type.

Figure 5D:
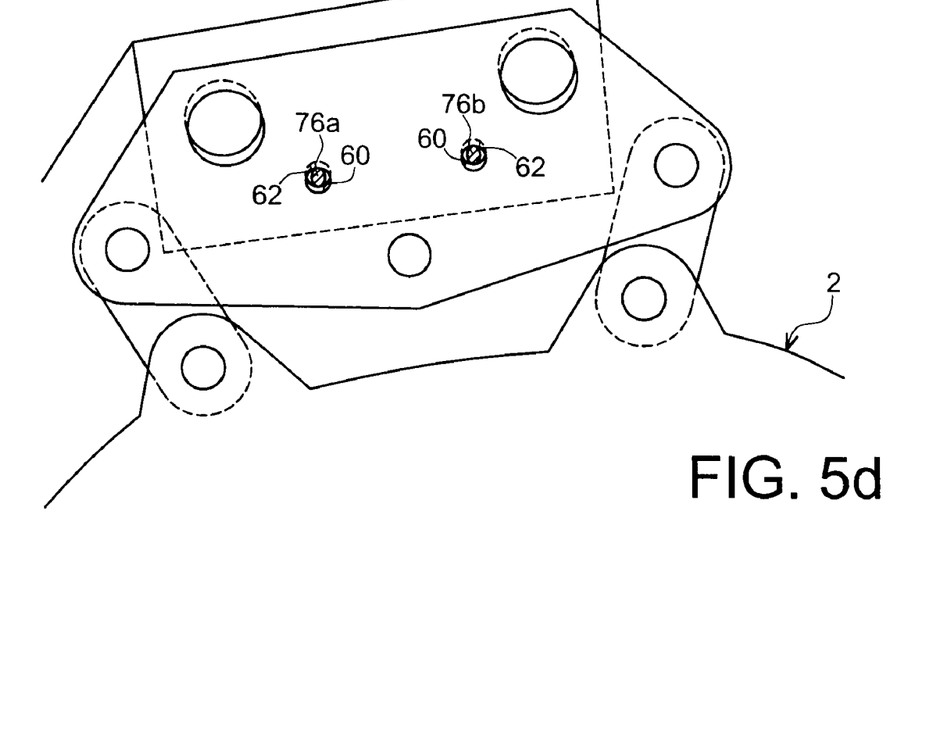

Therefore, once this operation is completed, it can be understood that the engine does not need to cooperate with lifting means in order to be held in its pre-position relative to engine mount 4.

Figure 5E:
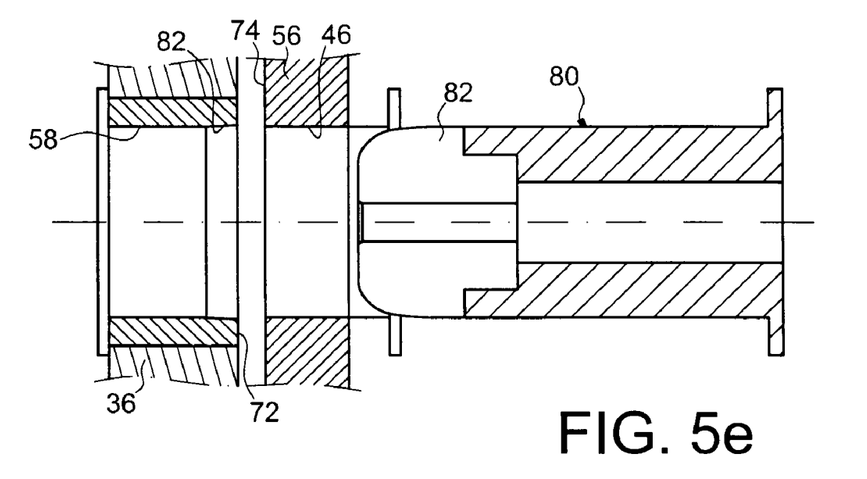

A new operation can then be started to insert two pins 80 in the first group of primary orifices and second group of primary orifices respectively.

As can be seen FIG. 5e, each pin 80 is fitted with a convex centering head 82 preferably olive-shaped and mounted by screwing or press-fitting for example onto a body of the pin 80, this pin being inserted firstly through the first primary orifice 56 of the body 46, then through the second primary orifice 58 that is slightly offset in upward direction. Therefore, as the pin 80 is inserted through the second orifice 58, the head 82 progressively cooperates with a forward bevelled part 84 thereof which is provided to facilitate insertion of the pin 80 in this same orifice 58. Evidently, the insertion of the centering head 82 of the pin 80 in orifice 58 will result in the gradual alignment of the two orifices 56, 58 of same diameter until perfect alignment is achieved therebetween. By way of indication it is noted that the diameter of the orifices 56, 58 is identical, except for clearance, to the diameter of the pin 80 inserted therein.

Figure 5F:
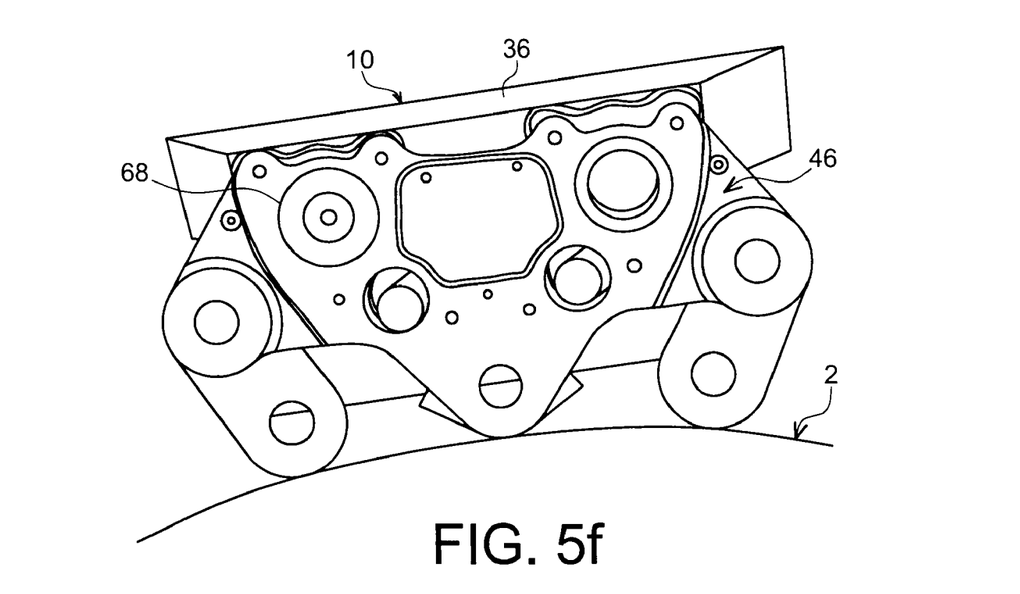

After insertion of the pin 80, it is housed in its two associated orifices 56, 58, and advantageously forms the shear pin 68 as shown FIG. 5f.

Figure 5G:
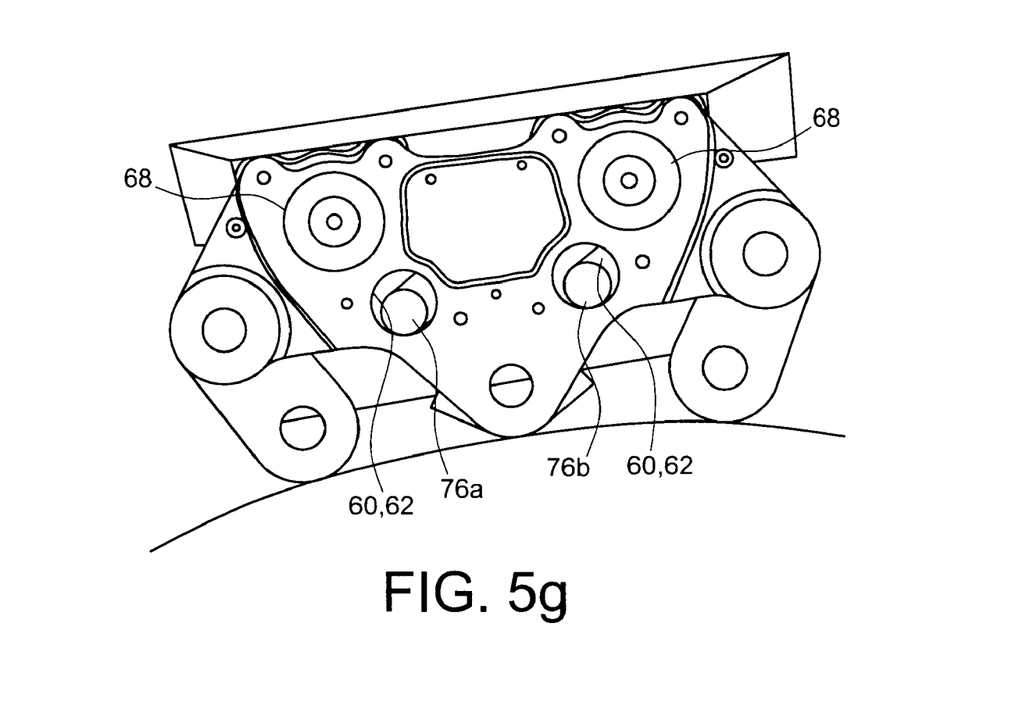

With reference to FIG. 5g, the same pin insertion operation is conducted for the second group of primary orifices, to achieve positioning of the second shear pin 68. Once the two shear pins have been inserted in their respective primary orifices, simultaneously or successively, the engine 2 which has then been lifted subsequent to alignment of the orifices 56, 58 then lies in its final position relative to the engine mount 4.

In this final position, the secondary orifices 60, 62 are also perfectly aligned in pairs.

Figure 5H:
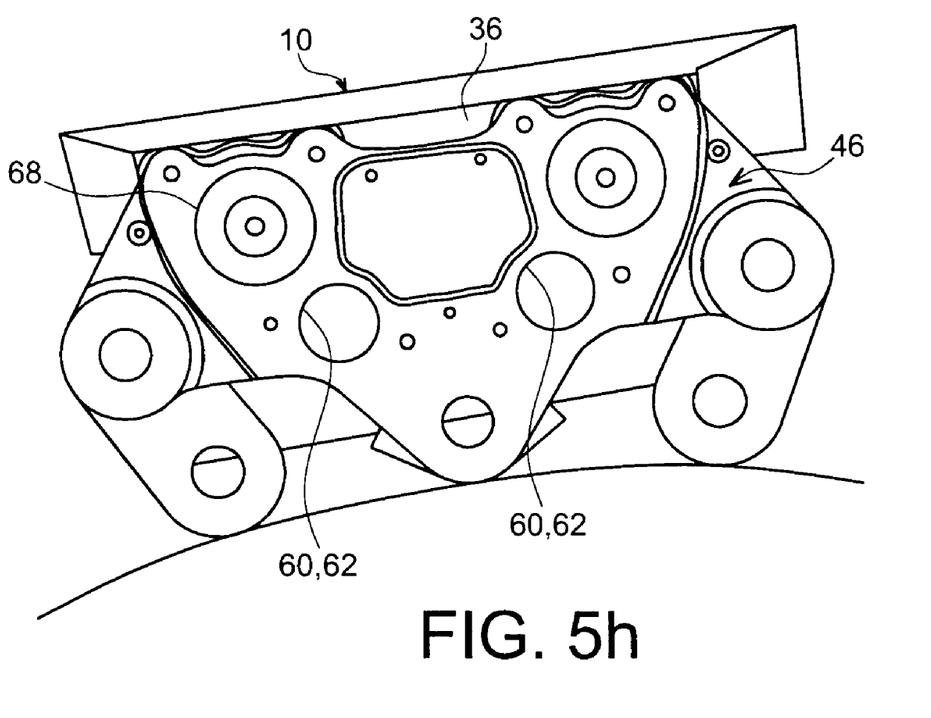

These support pins 76a, 76b can then be removed, leaving the secondary orifices free as shown FIG. 5h, to allow a subsequent operation to place in position two failsafe shear pins 70 in these same secondary orifices 60, 62.

The securing step of the attachment body 46 can then be continued by an operation to place the above-cited tension bolts in position, also oriented along direction X.

In the method of the invention, a similar securing step can be carried out for the aft attachment 8, whilst the mounting of the thrust links can be performed in conventional manner known to those skilled in the art.

Evidently, various modifications can be made by persons skilled in the art to the mounting method just described solely as a non-limiting example. In this respect, it can be indicated in particular that while this method has been described for the suspending of an engine below the aircraft wing, it could also be applied to ensure the mounting of this engine above this same wing.

The invention claimed is:

1. A method to mount an aircraft engine on a rigid structure of an engine mount for the engine, comprising:
    securing, on the rigid structure, an attachment body for an engine attachment previously mounted on an engine case, the attachment body configured to lie against a contact surface of the rigid structure oriented forwardly, and to be secured to the rigid structure via at least one shear pin passing through a first primary orifice and a second primary orifice made in the attachment body and the rigid structure respectively, the securing of the attachment body onto the rigid structure comprising:
        pre-positioning the engine relative to the engine mount to place the first primary orifice opposite the second primary orifice; and
        inserting a pin fitted with a convex centering head through the two opposite-facing primary orifices, so that the pin fitted with the convex centering head and housed in the two primary orifices forms the shear pin.

2. The mounting method according to claim 1, wherein the inserting a pin fitted with a convex centering head is repeated as many times as a number of intended shear pins between the attachment body and the rigid structure.

3. The mounting method according to claim 1, wherein the pre-positioning comprises:
    bringing the engine close to the engine mount to allow insertion of a first support pin through a first secondary orifice and a second secondary orifice made in the attachment body and the rigid structure respectively, and to allow insertion of a second support pin through a first secondary orifice and a second secondary orifice also made in the attachment body and rigid structure, respectively, each of the two support pins having a smaller diameter than the diameter of the associated first and second secondary orifices; and
    then lowering the engine until an upper part of each of the two first secondary orifices of the attachment body comes to bear against its associated support pin.

4. The mounting method according to claim 3, wherein, after the inserting each pin fitted with a convex centering head, the support pins are removed from the secondary orifices.

5. The mounting method according to claim 4, wherein after the removal of the support pins, two failsafe shear pins are inserted through the secondary orifices.

6. The mounting method according to claim 1, wherein the pre-positioning operation is performed so that the attachment body is positioned forwardly relative to the contact surface of the rigid structure, and wherein the inserting a pin fitted with a convex centering head is performed such that the pin is first inserted in its associated first primary orifice, before entering its associated second primary orifice.

7. The mounting method according to claim 6, wherein each second primary orifice is bevelled in its forward portion.

8. The mounting method according to claim 1, wherein the securing the attachment body onto the rigid structure further comprises placing tension bolts in position between these two elements.

9. The mounting method according to claim 1, wherein the securing the attachment body onto the rigid structure is performed for securing an aft engine attachment or for securing of a forward engine attachment.

10. The mounting method according to claim 1, wherein the securing the attachment body onto the rigid structure is performed for securing a forward engine attachment, and wherein the contact surface of the rigid structure is box-shaped, and is defined by a forward surface of a forward closure rib of the box.

11. The mounting method according to claim 10, wherein the contact surface is configured to be substantially oriented along a plane defined by a transverse direction and a vertical direction of the engine mount.

12. The mounting method according to claim 1, wherein each pin fitted with a convex centering head is configured to be inserted in its associated primary orifices along a longitudinal direction of the engine mount.

* * * * *